United States Patent
Richter

(10) Patent No.: US 8,360,302 B2
(45) Date of Patent: Jan. 29, 2013

(54) METHOD FOR PRODUCING OR REPAIRING INTEGRALLY BLADED GAS TURBINE ROTORS

(75) Inventor: Karl-Hermann Richter, Markt Indersdorf (DE)

(73) Assignee: MTU Aero Engines GmbH, Munich (DE)

( * ) Notice: Subject to any disclaimer, the term of this patent is extended or adjusted under 35 U.S.C. 154(b) by 0 days.

(21) Appl. No.: 13/125,998

(22) PCT Filed: Nov. 5, 2009

(86) PCT No.: PCT/DE2009/001564
§ 371 (c)(1),
(2), (4) Date: Apr. 26, 2011

(87) PCT Pub. No.: WO2010/054627
PCT Pub. Date: May 20, 2010

(65) Prior Publication Data
US 2011/0198390 A1 Aug. 18, 2011

(30) Foreign Application Priority Data
Nov. 13, 2008 (DE) .......................... 10 2008 057 188

(51) Int. Cl.
*B21K 25/00* (2006.01)
(52) U.S. Cl. ..................... 228/119; 228/112.1; 228/114; 29/889.1; 29/889.2; 29/889.23
(58) Field of Classification Search ............... 228/112.1, 228/114, 119; 29/889, 889.2, 889.1, 889.23
See application file for complete search history.

(56) References Cited

U.S. PATENT DOCUMENTS

| 6,438,838 | B1 * | 8/2002 | Meier et al. ................... 29/889.1 |
| 6,969,238 | B2 * | 11/2005 | Groh et al. ................. 416/213 R |
| 7,334,997 | B2 * | 2/2008 | Karafillis ....................... 416/224 |
| 2005/0084381 | A1 | 4/2005 | Groh et al. |
| 2007/0039179 | A1 * | 2/2007 | Koehler et al. ............. 29/889.23 |
| 2008/0148566 | A1 * | 6/2008 | Bayer et al. ................... 29/889.1 |
| 2009/0324398 | A1 * | 12/2009 | Hanrieder et al. .......... 415/182.1 |
| 2010/0284817 | A1 * | 11/2010 | Bamberg et al. ........... 416/241 R |

FOREIGN PATENT DOCUMENTS

| DE | 10343760 A1 | 4/2005 |
| DE | 102005019356 A1 | 9/2006 |
| EP | 1526252 A2 | 4/2005 |
| EP | 1698423 A1 | 9/2006 |
| WO | 2009049596 A1 | 4/2009 |
| WO | 2010020216 A1 | 2/2010 |

* cited by examiner

*Primary Examiner* — Kiley Stoner
*Assistant Examiner* — Devang R Patel
(74) *Attorney, Agent, or Firm* — Barlow, Josephs & Holmes, Ltd.

(57) ABSTRACT

The invention relates to a method for producing integrally bladed gas turbine rotors, especially of integrally bladed turbine rotors, wherein rotating blades (10) are joined to a rotor base (11) with the intermediate disposal of an adapter (14) in such a way that first an adapter is joined to a connecting section (15) of each rotating blade to be connected to the rotor base, and that subsequently each rotating blade (10) is joined to a connecting section (16) of rotor base (11) via adapter (14) connected to said blade. According to the invention, each adapter (14) is connected to connecting section (15) of the respective rotating blade (10) by welding, each rotating blade (10) being connected to the respective connecting section of the rotor base by inductive high-frequency pressure welding via adapter (14) connected to the blade.

9 Claims, 1 Drawing Sheet

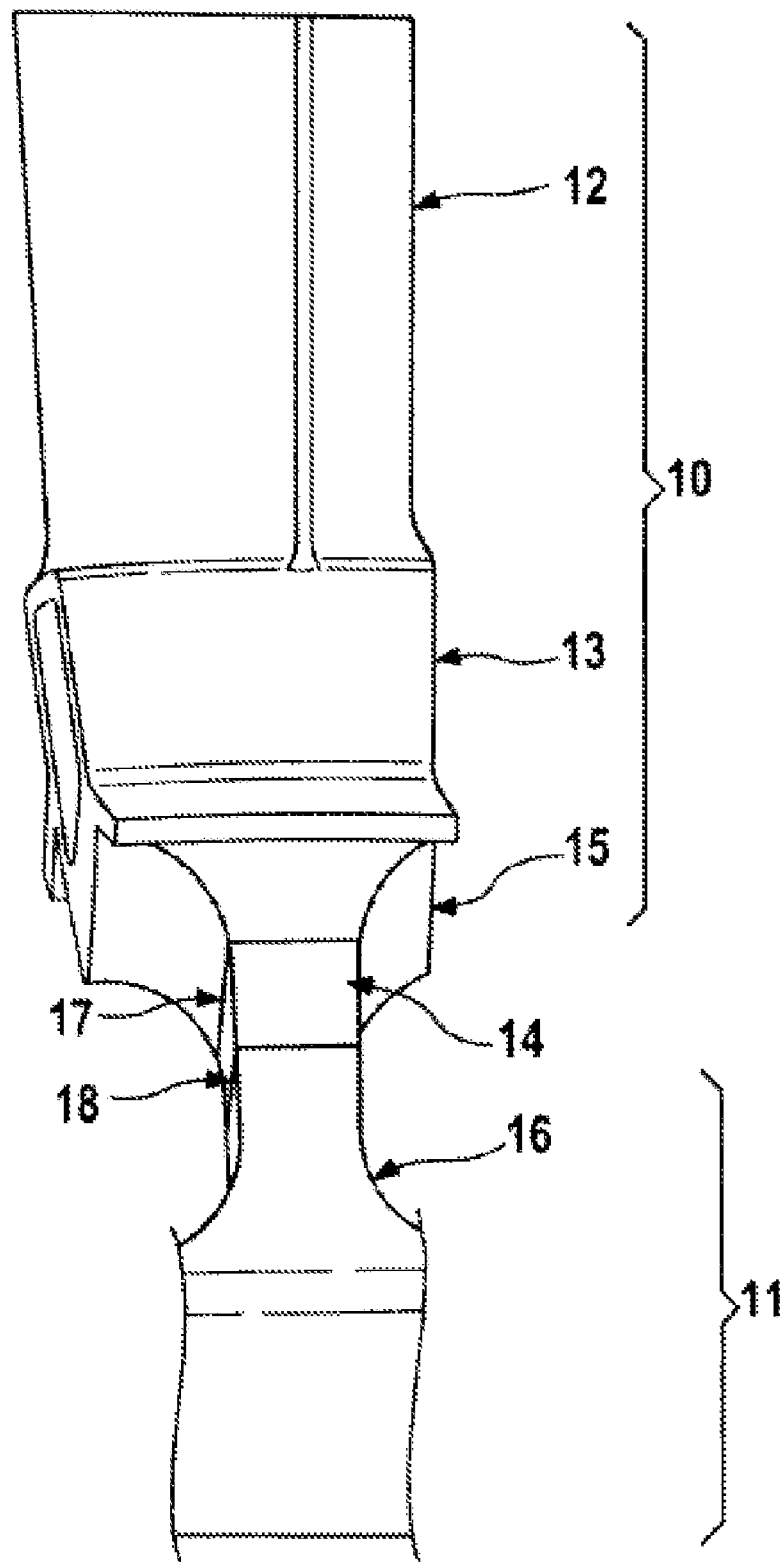

METHOD FOR PRODUCING OR REPAIRING INTEGRALLY BLADED GAS TURBINE ROTORS

BACKGROUND OF THE INVENTION

The invention relates to a method for producing integrally bladed gas turbine rotors according to the preamble of claim 1. In addition, the invention relates to a method for repairing integrally bladed gas turbine rotors according to the preamble of claim 8.

Modern gas turbines, particularly aircraft engines, must meet the highest requirements with respect to reliability, weight, performance, economy and service life. In the last few decades, particularly in the civil sector, aircraft engines that have fully met the above requirements have been developed and have achieved a high degree of technical perfection. Among other things, the selection of material, the search for new, suitable materials, as well as the search for new manufacturing methods play a decisive role in the development of aircraft engines. The most important materials used at the present time for aircraft engines or other gas turbines are titanium alloys, nickel alloys and high-strength steels. High-strength steels are used for shaft parts, gear parts, compressor housings and turbine housings. Titanium alloys are typical materials for compressor parts. Nickel alloys are suitable for the hot parts of the aircraft engine. Investment casting and forging are primarily known in the prior art as manufacturing processes for gas turbine parts made of titanium alloys, nickel alloy or other alloys. All highly stressed gas turbine parts, such as, for example, blades for a compressor, are forged parts. Rotating blades and vanes of the turbine, in contrast, are usually designed as investment cast parts.

In order to increase the efficiency of gas turbines, the rotors thereof are increasingly designed as integrally bladed rotors. Integrally bladed rotors are also called blisk (bladed disk) or bling (bladed ring), and in fact, are dependent on whether a disk-shaped rotor base or an annular rotor base is present. All methods for producing integrally bladed rotors that are known up to now from the prior art require a high manufacturing outlay and are thus expensive. In addition, the repair of integrally bladed rotors offers difficulties.

Proceeding therefrom, the problem of the present invention is based on proposing a novel method for producing or repairing integrally bladed gas turbine rotors.

BRIEF SUMMARY OF THE INVENTION

This problem is solved by a method for producing integrally bladed gas turbine rotors according to claim 1. Accordingly, each adapter having a connecting section for the respective rotating blade is connected to the blade by friction welding, and each rotating blade is connected to the respective connecting section of the rotor base via the adapter connected to the blade by means of inductive high-frequency pressure welding.

The method according to the invention for repairing integrally bladed gas turbine rotors is defined in claim 8. Accordingly, a damaged rotating blade is separated from the rotor base in such a way that first the adapter of the blade is separated, subsequently the remaining section of the adapter is completely removed from the connecting section of the rotor base, and following that, a new rotating blade or a repaired rotating blade is connected to the connecting section of the rotor base in such a way that an adapter connected to the new rotating blade or the repaired rotating blade is connected to the respective connecting section of the rotor base by inductive high-frequency pressure welding.

The method according to the invention for producing or repairing integrally bladed gas turbine rotors preferably finds use in the production and repair of turbine rotors, wherein, in the production or repair of an integrally bladed turbine rotor, rotating blades that are produced by casting technology and that are made of a material that is not suitable for fusion welding are joined via the adapter to a rotor base produced by forging technology, the rotor base being produced from a material that is suitable for fusion welding. The adapters, by means of which the rotating blades are joined to the rotor base, are formed of a material suitable for fusion welding, whereby the adapter made of material suitable for fusion welding is joined by friction welding to the rotating blade made of material that is not suitable for fusion welding, and whereby the rotating blade is connected via the adapter to the rotor base made of material suitable for fusion welding by means of inductive high-frequency pressure welding. A simple and cost-effective production as well as repair of integrally bladed gas turbine rotors, particularly integrally bladed turbine rotors, is made possible in this way.

Preferred enhancements of the invention are taken from the subclaims and the following description. Embodiment examples of the invention will be explained in more detail based on the drawing, but are not limited thereto. Here:

BRIEF DESCRIPTION OF THE SEVERAL VIEWS OF THE DRAWINGS(S)

FIG. 1 shows a schematized representation for illustrating the method according to the invention for producing or repairing integrally bladed gas turbine rotors.

DETAILED DESCRIPTION OF THE INVENTION

The invention presented here relates to a method for producing or repairing integrally bladed gas turbine rotors, whereby the method particularly finds use in the production and repair of integrally bladed turbine rotors. These types of integrally bladed turbine rotors provide a rotor base that is produced by forging technology and that is made of a material suitable for fusion welding as well as rotating blades that are produced by casting technology and that are made of a material not suitable for fusion welding. The rotating blades of such turbine rotors produced by casting technology have a polycrystalline, directionally solidified, or a monocrystalline material structure with a high γ' fraction and are thus not suitable for fusion welding.

FIG. 1 shows an excerpt from a gas turbine rotor to be produced or to be repaired, in the region of a rotating blade 10 and a rotor base 11, wherein rotating blade 10 comprises a blade 12 and a blade foot 13. According to FIG. 1, rotating blade 10 is connected to rotor base 11 via an adapter 14, wherein adapter 14, on the one hand, engages at a connecting section 15 of rotating blade 10 and, on the other hand, at a connecting section 16 of rotor base 11. In an integrally bladed turbine rotor, whose rotor base 11 is made of a material suitable for fusion welding, and whose rotating blades 10 are made of a material not suitable for fusion welding, adapters 14, by means of which rotating blades 10 are connected to rotor base 11, are manufactured from a material suitable for fusion welding.

In the sense of the invention, the procedure is such that when an integrally bladed gas turbine rotor is produced, adapters 14 will be joined in a first step to connecting sections 15 of rotating blades 10 by friction welding.

In this way, a joining zone 17 is formed, wherein, preferably, linear friction welding or rotational friction welding is used as the friction-welding method for connecting adapters 14 to connecting sections 15 of rotating blades 10.

After adapters 14 are connected to rotating blades 10, rotating blades 10 are connected via adapters 14 to connecting sections 16 of rotor base 11 by means of inductive high-frequency pressure welding. In this way, joining zones 18 are formed between adapters 14 and connecting sections 16 of rotor base 11.

In the case of inductive high-frequency pressure welding for connecting a rotating blade 10 to connecting region 16 of rotor base 11 via adapter 14 joined to rotating blade 10, the connecting section 16 of rotor base 11 as well as adapter 14 is fully or partially enveloped by an induction coil, by means of which eddy currents are induced for heating joining zone 18 between adapter 14 and connecting section 16 of rotor base 11. In this way, a molten phase is formed in joining zone 18 so that the inductive high frequency weld between adapter 14 and connecting section 16 of rotor base 11 can be effected with relatively low compressive forces on the order of magnitude between 10 and 20 MPa. The molten phase is completely forced out of joining zone 18 in this way.

Following the above-presented connecting of a rotating blade 10 to rotor base 11 by means of adapter 14, a mechanical processing or machining of at least joining zones 17, 18 is preferably carried out, e.g., by milling or ECM (Electro Chemical Machining) or PECM (Precise Electro Chemical Machining), in order to provide the latter with a defined contour. Further, a heat treatment of the produced gas turbine rotor can be conducted, wherein at least joining zones 17, 18 are subjected to a heat treatment. It is likewise possible to subject the entire gas turbine rotor to a heat treatment.

In the case of repairing such an integrally bladed gas turbine rotor, the procedure is such that first at least one damaged rotating blade 10 is removed from rotor base 11 in such a way that the corresponding adapter 14, by means of which the damaged rotating blade 10 is fastened to rotor base 11, is separated.

Adapter 14 can thus be separated at approximately the level of the half radial center of adapter 14. Adapter 14 can be separated by an abrading procedure, an EDM machining such as eroding or by other separation methods.

Following the separation of a damaged rotating blade 10 by the separation of adapter 14, the section of the adapter remaining on connecting section 16 of rotor base 11 is completely removed or stripped away from connecting section 16, and in fact, removed up to the initial position of joining zone 18, whereby this can be accomplished e.g., by milling, grinding or other methods.

Subsequently, a new rotating blade or a repaired rotating blade is connected to connecting region 16, i.e., via an adapter connected to the new rotating blade or the repaired rotating blade, this adapter being connected to connecting section 16 of rotor base 11 via inductive high-frequency pressure welding.

Then, if a new rotating blade 10 is connected to rotor base 11, first a new adapter 14 is connected to connecting section 15 of rotating blade 10 by friction welding, whereby subsequently rotating blade 10 is joined to connecting section 16 of rotor base 11 via adapter 14 by means of inductive high-frequency pressure welding.

Then, if a rotating blade that is first separated from the rotor base and then repaired after separation is to be connected to connecting section 16 of rotor base 11, the section of the separated adapter 14 that remains at connecting section 16 of the repaired rotating blade is first plane ground in order to produce a planar surface, whereby adapter 14 is rebuilt on this planar surface, in particular by laser resurfacing by welding, such as, e.g., laser powder resurfacing by welding or laser wire resurfacing by welding, or by microplasma resurfacing by welding. Alternatively, the adapter can be completely removed and a new adapter can be introduced by IHFP (inductive high-frequency pressure welding). Subsequently, the rebuilt adapter is post-processed in order to produce a desired contour, whereby this post-processing is particularly effected by milling. Following this, the repaired gas turbine blade 10 can then be connected via the rebuilt adapter 14 to the correspondingly prepared connecting section 16 of rotor base 11.

As in the case of the new manufacture of a gas turbine rotor, a mechanical machining and/or a heat treatment can be carried out also in the case of repairing a gas turbine rotor after a rotating blade is connected to the rotor base, at least in the region of the joining zones. Likewise, it is possible to subject the entire gas turbine rotor to a heat treatment after it has been repaired.

Particularly in the repair of an integrally bladed gas turbine rotor, it is possible, after removing the section of adapter 14 that remains on connecting section 16 of rotor base 11 to locally enlarge connecting section 16 by laser powder resurfacing by welding, in order to make possible a mechanical machining of joining regions 17, 18 to the final dimension after a rotating blade 10 is joined to connecting section 16 of rotor base 11.

With the invention, individual rotating blades and rotating blade segments that comprise several rotating blades can be joined to the rotor base during the production or repair of integrally bladed gas turbine rotors.

The invention claimed is:

1. A method for repairing integrally bladed turbine rotors, wherein a rotating blade, having a connecting section, is joined to a rotor base, having a connecting section, with the intermediate disposal of an adapter in such a way that the adapter is joined to the connecting section of the rotating blade to be connected to the rotor base, and that subsequently, the rotating blade is joined via the adapter connecting thereto to the connecting section of the rotor base, wherein the adapter is connected to the connecting section of the rotating blade by friction welding, and that the rotating blade is connected to the connecting section of the rotor base via the adapter connected to the blade by inductive high-frequency pressure welding; and wherein a damaged rotating blade is separated from the rotor base in such a way that the adapter is separated, and that subsequently any remaining section of the adapter is completely removed from the connecting section of the rotor base and, following that, a non-damaged rotating blade is connected to the connecting section of the rotor base so that an adapter connected to the non-damaged rotating blade is connected to the connecting section of the rotor base by inductive high-frequency pressure welding.

2. The method according to claim 1, wherein the adapter is connected to the rotating blade by linear friction welding.

3. The method according to claim 1, wherein the adapter is connected to the rotating blade by rotational friction welding.

4. The method according to claim 1, wherein at least joining zones are mechanically machined after the rotating blade is connected to the rotor base.

5. The method according to claim 1, wherein at least joining zones are subjected to a heat treatment after the rotating blade is connected to the rotor base.

6. The method according to claim 1, wherein an adapter made of a material suitable for fusion welding is used.

7. The method according to claim 1, wherein a rotating blade made of a material not suitable for fusion welding is joined to a rotor base made of a material suitable for fusion welding.

8. The method according to claim 1, wherein then, if the non-damaged blade is a repaired blade that has first been separated from the rotor base and repaired after separation is connected to the connecting section of the rotor base, first the section of the adapter remaining on the connecting section of the rotating blade is plane ground, subsequently it is rebuilt by laser resurfacing by welding and following this, is made into a desired contour.

9. The method according to claim 8, wherein the adapter that is rebuilt by laser resurfacing by welding is made into the desired contour by milling.

* * * * *